United States Patent
Ohno et al.

(10) Patent No.: US 8,544,056 B2
(45) Date of Patent: Sep. 24, 2013

(54) IMAGE CONTROL APPARATUS AND IMAGE CONTROL METHOD

(75) Inventors: Tomoyuki Ohno, Zama (JP); Takashi Yamamoto, Yamato (JP); Yuichi Matsumoto, Fujisawa (JP); Tomoyasu Yoshikawa, Kawasaki (JP); Teruki Kikkawa, Machida (JP); Satoshi Hanamitsu, Kawasaki (JP); Tomoya Asanuma, Yokohama (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1188 days.

(21) Appl. No.: 11/932,026

(22) Filed: Oct. 31, 2007

(65) Prior Publication Data
US 2008/0129877 A1 Jun. 5, 2008

(30) Foreign Application Priority Data

Dec. 5, 2006 (JP) ................................. 2006-328207

(51) Int. Cl.
*H04N 7/16* (2011.01)
(52) U.S. Cl.
USPC ............ 725/151; 348/564; 348/565; 348/588
(58) Field of Classification Search
None
See application file for complete search history.

(56) References Cited

U.S. PATENT DOCUMENTS

2002/0078447 A1* 6/2002 Mizutome et al. .............. 725/37
2005/0134900 A1* 6/2005 Kuwata ......................... 358/1.15

FOREIGN PATENT DOCUMENTS

| JP | 07-007685 | A |   | 1/1995 |
| JP | 07-007685 | A |   | 1/1995 |
| JP | 08-265663 | A |   | 10/1996 |
| JP | 09-219830 | A |   | 8/1997 |
| JP | 2001-111916 | A |   | 4/2001 |
| JP | 2001111916 | A | * | 4/2001 |
| JP | 2002-158941 | A |   | 5/2002 |
| JP | 2003-348488 | A |   | 12/2003 |

\* cited by examiner

*Primary Examiner* — Chenea Smith
(74) *Attorney, Agent, or Firm* — Canon U.S.A., Inc. IP Division (57) ABSTRACT

An image control apparatus is configured to input a plurality of image data associated with a plurality of image sources and to display a plurality of images on a same screen based on the plurality of image data. The image control apparatus includes an image quality determining unit configured to determine respective image qualities of the plurality of images based on a combination of image information associated with attributes of the plurality of image sources, and an image processing unit configured to process the plurality of image data to cause the plurality of images to have the respective image qualities determined by the image quality determining unit.

10 Claims, 9 Drawing Sheets

| INDEX | GENRE | | MAXIMUM LUMINANCE (cd/m²) | MAXIMUM CONTRAST |
|---|---|---|---|---|
| 10 | MAIN IMAGE | MOVIE | 250 | 400 |
| 11 | SUB IMAGE | MOVIE | 250 | 400 |
| 12 | | DRAMA | 250 | 375 |
| 13 | | SPORTS | 300 | 590 |
| 14 | | VARIETY SHOW | 320 | 710 |
| 15 | | ANIMATION | 300 | 625 |
| 16 | | NO INFORMATION | 300 | 600 |
| 20 | MAIN IMAGE | DRAMA | 300 | 450 |
| 21 | SUB IMAGE | MOVIE | 250 | 400 |
| 22 | | DRAMA | 300 | 450 |
| 23 | | SPORTS | 350 | 690 |
| 24 | | VARIETY SHOW | 400 | 880 |
| 25 | | ANIMATION | 400 | 880 |
| 26 | | NO INFORMATION | 320 | 640 |
| ... | ... | ... | ... | ... |
| ... | ... | ... | ... | ... |
| ... | ... | ... | ... | ... |
| 60 | MAIN IMAGE | NO INFORMATION | 400 | 800 |
| 61 | SUB IMAGE | MOVIE | 250 | 400 |
| 62 | | DRAMA | 300 | 450 |
| 63 | | SPORTS | 400 | 790 |
| 64 | | VARIETY SHOW | 400 | 880 |
| 65 | | ANIMATION | 400 | 880 |
| 66 | | NO INFORMATION | 400 | 800 |

| INDEX | GENRE | MAXIMUM LUMINANCE (cd/m$^2$) | MAXIMUM CONTRAST |
|---|---|---|---|
| 1 | MOVIE | 250 | 400 |
| 2 | DRAMA | 300 | 450 |
| 3 | SPORTS | 430 | 850 |
| 4 | VARIETY SHOW | 450 | 1000 |
| 5 | ANIMATION | 480 | 1000 |
| 6 | NO INFORMATION | 400 | 800 |

FIG.4

| INDEX | GENRE | | MAXIMUM LUMINANCE (cd/m²) | MAXIMUM CONTRAST |
|---|---|---|---|---|
| 10 | MAIN IMAGE | MOVIE | 250 | 400 |
| 11 | SUB IMAGE | MOVIE | 250 | 400 |
| 12 | | DRAMA | 250 | 375 |
| 13 | | SPORTS | 300 | 590 |
| 14 | | VARIETY SHOW | 320 | 710 |
| 15 | | ANIMATION | 300 | 625 |
| 16 | | NO INFORMATION | 300 | 600 |
| 20 | MAIN IMAGE | DRAMA | 300 | 450 |
| 21 | SUB IMAGE | MOVIE | 250 | 400 |
| 22 | | DRAMA | 300 | 450 |
| 23 | | SPORTS | 350 | 690 |
| 24 | | VARIETY SHOW | 400 | 880 |
| 25 | | ANIMATION | 400 | 880 |
| 26 | | NO INFORMATION | 320 | 640 |
| ... | ... | ... | ... | ... |
| ... | ... | ... | ... | ... |
| ... | ... | ... | ... | ... |
| 60 | MAIN IMAGE | NO INFORMATION | 400 | 800 |
| 61 | SUB IMAGE | MOVIE | 250 | 400 |
| 62 | | DRAMA | 300 | 450 |
| 63 | | SPORTS | 400 | 790 |
| 64 | | VARIETY SHOW | 400 | 880 |
| 65 | | ANIMATION | 400 | 880 |
| 66 | | NO INFORMATION | 400 | 800 |

| INDEX | GENRE | | MAXIMUM LUMINANCE (cd/m²) | MAXIMUM CONTRAST |
|---|---|---|---|---|
| 10 | MAIN IMAGE | MOVIE | 250 | 400 |
| 11 | SUB IMAGE | MOVIE | 250 | 400 |
| 12 | | DRAMA | 240 | 360 |
| 13 | | SPORTS | 344 | 680 |
| 14 | | VARIETY SHOW | 360 | 800 |
| 15 | | ANIMATION | 384 | 800 |
| 16 | | OTHERS | 320 | 640 |
| 20 | MAIN IMAGE | DRAMA | 300 | 450 |
| 21 | SUB IMAGE | MOVIE | 250 | 400 |
| 22 | | DRAMA | 300 | 450 |
| 23 | | SPORTS | 344 | 680 |
| 24 | | VARIETY SHOW | 360 | 800 |
| 25 | | ANIMATION | 384 | 800 |
| 26 | | OTHERS | 320 | 640 |
| ... | ... | ... | ... | ... |
| ... | ... | ... | ... | ... |
| ... | ... | ... | ... | ... |
| 60 | MAIN IMAGE | OTHERS | 400 | 800 |
| 61 | SUB IMAGE | MOVIE | 250 | 400 |
| 62 | | DRAMA | 300 | 450 |
| 63 | | SPORTS | 344 | 680 |
| 64 | | VARIETY SHOW | 360 | 800 |
| 65 | | ANIMATION | 384 | 800 |
| 66 | | OTHERS | 400 | 800 |

FIG.7

| INDEX | GENRE | | MAXIMUM LUMINANCE (cd/m²) | MAXIMUM CONTRAST |
|---|---|---|---|---|
| 10 | MAIN IMAGE | MOVIE | 250 | 400 |
| 11 | SUB IMAGE | MOVIE | 250 | 400 |
| 12 | | DRAMA | 250 | 375 |
| 13 | | SPORTS | 300 | 590 |
| 14 | | VARIETY SHOW | 320 | 710 |
| 15 | | ANIMATION | 300 | 625 |
| 16 | | DATA BROADCASTING | 310 | 630 |
| 17 | | NO INFORMATION | 300 | 600 |
| 20 | MAIN IMAGE | DRAMA | 300 | 450 |
| 21 | SUB IMAGE | MOVIE | 250 | 400 |
| 22 | | DRAMA | 300 | 450 |
| 23 | | SPORTS | 350 | 690 |
| 24 | | VARIETY SHOW | 400 | 880 |
| 25 | | ANIMATION | 400 | 880 |
| 26 | | DATA BROADCASTING | 420 | 900 |
| 27 | | NO INFORMATION | 320 | 640 |
| ... | ... | ... | ... | ... |
| ... | ... | ... | ... | ... |
| ... | ... | ... | ... | ... |
| 60 | MAIN IMAGE | NO INFORMATION | 400 | 800 |
| 61 | SUB IMAGE | MOVIE | 250 | 400 |
| 62 | | DRAMA | 300 | 450 |
| 63 | | SPORTS | 400 | 790 |
| 64 | | VARIETY SHOW | 400 | 880 |
| 65 | | ANIMATION | 400 | 880 |
| 66 | | DATA BROADCASTING | 420 | 900 |
| 67 | | NO INFORMATION | 400 | 800 |

| INDEX | GENRE | | MAXIMUM LUMINANCE (cd/m²) | MAXIMUM CONTRAST |
|---|---|---|---|---|
| 10 | MAIN IMAGE | MOVIE | 250 | 400 |
| 11 | SUB IMAGE | MOVIE | 250 | 400 |
| 12 | | DRAMA | 250 | 375 |
| 13 | | SPORTS | 300 | 590 |
| 14 | | VARIETY SHOW | 320 | 710 |
| 15 | | ANIMATION | 300 | 625 |
| 16 | | DATA BROADCASTING | 310 | 630 |
| 17 | | GAME | 350 | 680 |
| 18 | | NO INFORMATION | 300 | 600 |
| 20 | MAIN IMAGE | DRAMA | 300 | 450 |
| 21 | SUB IMAGE | MOVIE | 250 | 400 |
| 22 | | DRAMA | 300 | 450 |
| 23 | | SPORTS | 350 | 690 |
| 24 | | VARIETY SHOW | 400 | 880 |
| 25 | | ANIMATION | 400 | 880 |
| 26 | | DATA BROADCASTING | 420 | 900 |
| 27 | | GAME | 430 | 920 |
| 28 | | NO INFORMATION | 320 | 640 |
| ... | ... | ... | ... | ... |
| ... | ... | ... | ... | ... |
| ... | ... | ... | ... | ... |
| 60 | MAIN IMAGE | NO INFORMATION | 400 | 800 |
| 61 | SUB IMAGE | MOVIE | 250 | 400 |
| 62 | | DRAMA | 300 | 450 |
| 63 | | SPORTS | 400 | 790 |
| 64 | | VARIETY SHOW | 400 | 880 |
| 65 | | ANIMATION | 400 | 880 |
| 66 | | DATA BROADCASTING | 420 | 900 |
| 67 | | GAME | 430 | 920 |
| 68 | | NO INFORMATION | 400 | 800 |

IMAGE CONTROL APPARATUS AND IMAGE CONTROL METHOD

BACKGROUND OF THE INVENTION

1. Field of the Invention

The present invention relates to an image control apparatus configured to simultaneously display a plurality of images on the same screen and a related image control method. More specifically, the present invention relates to an image control apparatus configured to display a plurality of images having respective image qualities determined according to image information and a related image control method.

2. Description of the Related Art

A conventional television receiver capable of simultaneously displaying a plurality of images of different television (TV) programs on the same screen is known. Furthermore, a conventional image quality control apparatus capable of automatically adjusting the image quality of a displayed image according to a viewer's preference is known.

As discussed in Japanese Patent Application Laid-Open No. 2002-158941, a conventional image quality control apparatus automatically regulates the image quality of an image to an optimum setting state desired by a viewer according to the type of a TV program (e.g., name of TV program, genre of TV program, broadcasting channel, and broadcasting time slot) to be viewed by the viewer.

A conventional television receiver discussed in Japanese Patent Application Laid-Open No. 07-007685 automatically performs an image control operation optimized independently for each sectioned screen, as one of functions realized by a display apparatus capable of simultaneously displaying a plurality of sectioned screens (sub-screens) on the same screen.

However, the following problems may arise when a conventional image control apparatus performs an image quality adjustment independently for respective images displayed on the same screen.

The simultaneous display of two or more images on the same screen may cause adverse effects on the displayed images if the types of images are different. For example, the following problem arises when the genre of a main image is "movie" and the genre of a sub image is "sports."

In general, a conventional image quality adjustment includes setting a low luminance for an image of the "movie" genre and a high luminance for an image of the "sports" genre. Therefore, the main image ("movie" image) and the sub image ("sports" image) have a large difference in brightness when displayed on the same screen. As a result, the sub image has an adverse effect on the main image. A user, who is viewing the main image, feels a flicker effect or disturbance.

SUMMARY OF THE INVENTION

Exemplary embodiments of the present invention are directed to an image control apparatus capable of automatically adjusting the image quality of each of a plurality of images simultaneously displayed on the same screen and realizing an viewing environment optimized for a user, even when the displayed images are mutually different in type.

According to an aspect of the present invention, an image control apparatus is configured to input a plurality of image data associated with a plurality of image sources and to display a plurality of images on a same screen based on the plurality of image data. The image control apparatus includes an image quality determining unit configured to determine respective image qualities of the plurality of images based on a combination of image information associated with attributes of the plurality of image sources, and an image processing unit configured to process the plurality of image data to cause the plurality of images to have the respective image qualities determined by the image quality determining unit.

According to another aspect of the present invention, a method for inputting a plurality of image data associated with a plurality of image sources and displaying a plurality of images on a same screen based on the plurality of image data is provided. The method includes determining respective image qualities of the plurality of images based on a combination of image information associated with attributes of the plurality of image sources, and processing the plurality of image data to cause the plurality of images to have the respective determined image qualities.

According to an exemplary embodiment of the present invention, when two or more images that are mutually different in type (e.g., genre of image) are simultaneously displayed on a same screen, an adverse effect of a certain type of image on another type of image can be reduced. Thus, a flicker effect or disturbance can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Exemplary embodiments will be described in detail below with reference to the drawings.

Figure 1:
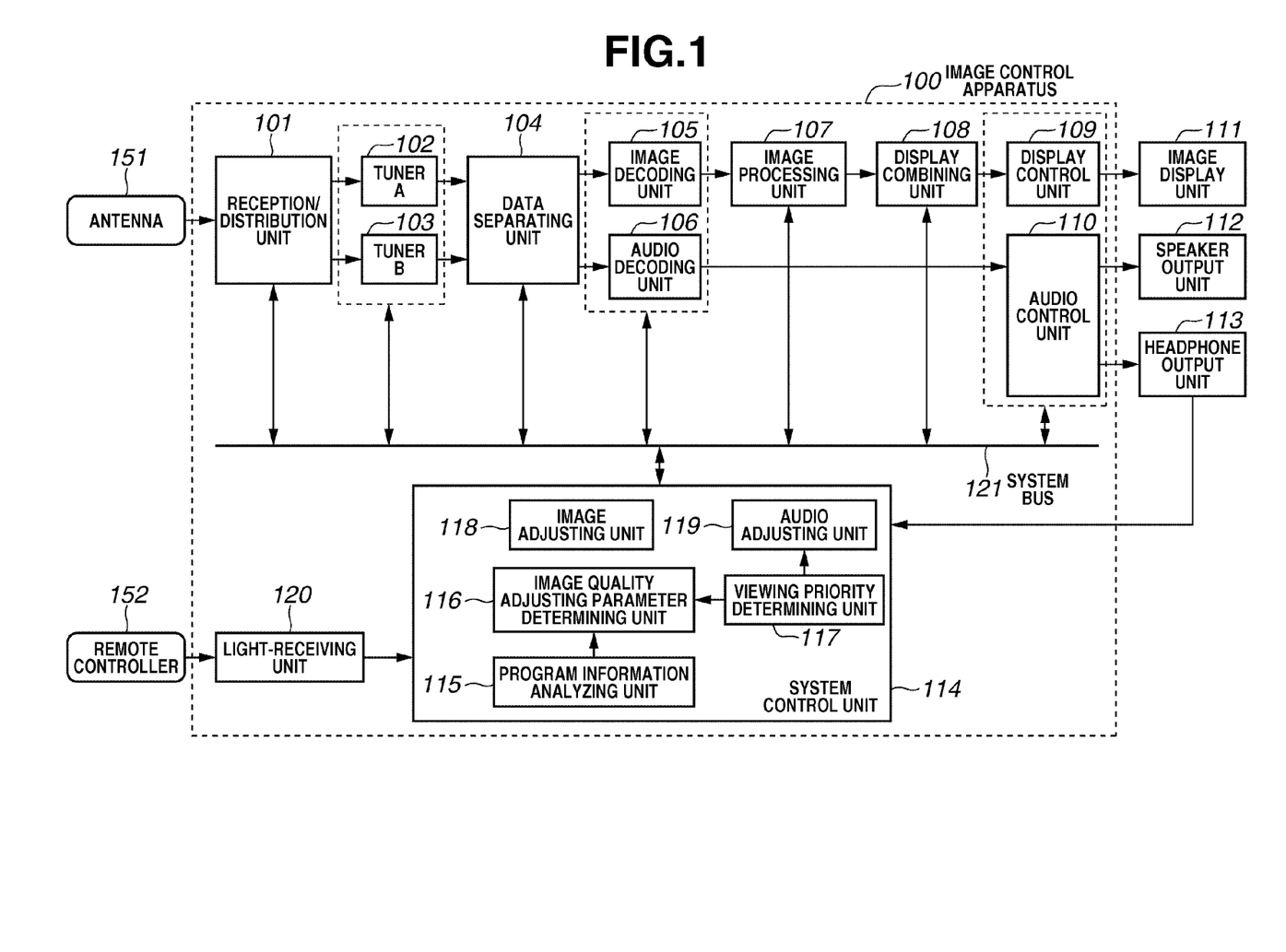
FIG. 1 is a block diagram illustrating an example of a configuration of an image control apparatus according to an exemplary embodiment of the present invention.

FIG. 1 is a block diagram illustrating an example of a configuration of an image control apparatus 100 according to a first exemplary embodiment of the present invention.

The image control apparatus 100 receives a digital broadcasting signal via an antenna 151. An image display unit 111 displays a broadcast image and TV program information of a channel selected by a user, who can operate a remote controller 152. In the present embodiment, TV programs of a plurality of channels received by the image control apparatus 100 correspond to a plurality of image sources. TV program information corresponds to image information associated with attributes of the plurality of image sources.

The image control apparatus 100 includes two modules for receiving TV broadcasting signals (i.e., tuner A 102 and tuner B 103). The image display unit 111 can simultaneously display broadcasting program images received via the tuner A 102 and the tuner B 103. A speaker output unit 112 and a headphone output unit 113 each can generate and output sound.

Figure 2:
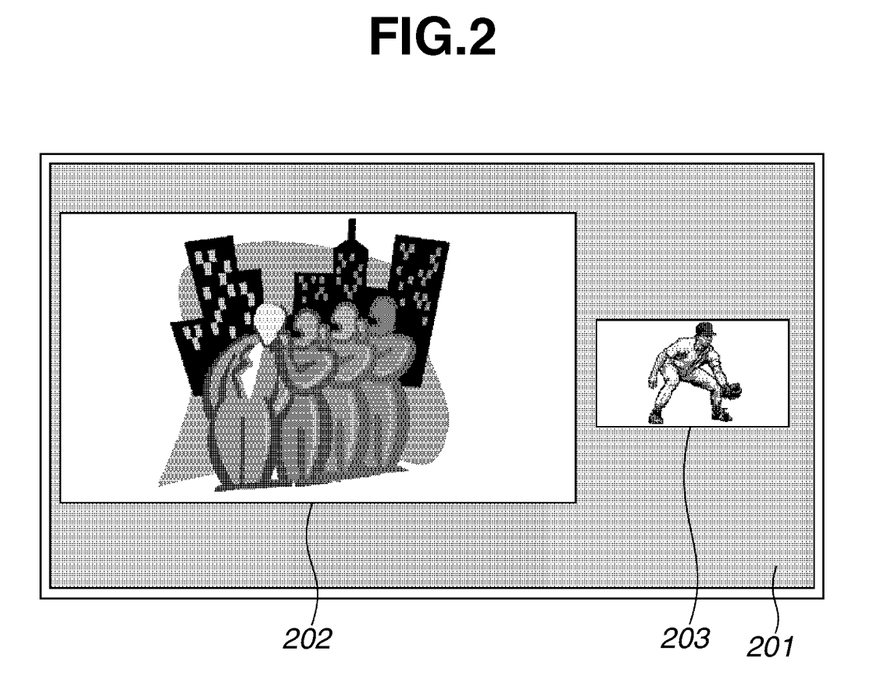
FIG. 2 illustrates an example of two images displayed on a display screen of an image display unit according to an exemplary embodiment of the present invention.

FIG. 2 illustrates an example of two images simultaneously displayed on a display screen 201 of the image display unit 111, which can be controlled by the image control apparatus 100, according to an exemplary embodiment of the present invention. The image control apparatus 100 can control the display position and display size of a main image 202 (i.e., an image being mainly viewed by the user) and a sub image 203 (i.e., an image being not mainly viewed by the user) such that the main image 202 and the sub image 203 do not overlap each other on the display screen 201.

A reception/distribution unit 101 receives a broadcasting signal via the antenna 151 and distributes the broadcasting signal to the tuner A 102 and the tuner B 103. Both tuner A 102 and the tuner B 103 perform predetermined processing (demodulation, error correction, etc.) on an input signal and outputs a transport stream (TS) to a data separating unit 104. The transport stream (TS) includes time-division-multiplexed data including image and audio data of a plurality of channels and related TV program information.

The data separating unit 104 separates image data, audio data, and TV program information associated with a selected channel from the received TS, based on operational information received via a light-receiving unit 120 from the remote controller 152, which enables the user to select a desired channel. The TV program information includes attribute information of each TV program (e.g., TV program name, broadcasting channel, program media identification information, broadcasting time information, and program genre information). The program media identification information identifies whether the current program is a "television broadcasting", which mainly includes image data and audio data, a "radio broadcasting", which mainly includes audio data, or a "data broadcasting", which mainly includes text/graphic data.

An image decoding unit 105 performs Moving Picture Experts Group (MPEG) or other decoding processing on the image data separated by the data separating unit 104. An image processing unit 107 receives decoded image data from the image decoding unit 105. A system control unit 114 receives TV program information from the data separating unit 104 via a system bus 121.

The image processing unit 107 processes image data according to image quality adjusting parameter information determined by an image quality adjusting parameter determining unit 116 included in the system control unit 114. The image data processed by the image processing unit 107 can provide an image having a desired image quality (luminance, contrast, etc.). The image quality adjusting parameter determining unit 116 performs an operation for determining image quality adjusting parameters as described below.

A display combining unit 108 can generate one-screen image data representing a plurality of images based on a plurality of image data. An image adjusting unit 118 included in the system control unit 114 determines the display position and size of each image according to user's operational information input via the remote controller 152.

A display control unit 109 receives the image data from the display combining unit 108 and converts the received image data into display data suitable for the image display unit 111 (e.g., according to a display resolution, the number of display colors, and a refresh rate of the image display unit 111), and outputs the converted data to the image display unit 111.

An audio decoding unit 106 performs decoding processing on the audio data separated by the data separating unit 104. The audio decoding unit 106 outputs decoded audio data to the speaker output unit 112 and the headphone output unit 113 via an audio control unit 110.

The audio control unit 110 can change an output destination and a volume level of respective audio data. An audio adjusting unit 119 included in the system control unit 114 determines the output destination and the volume level of respective audio data according to user's operational information input via the remote controller 152.

Next, an exemplary operation for determining image quality adjusting parameters according to an exemplary embodiment of the present invention will be described.

The image quality adjusting parameter determining unit 116 determines image quality adjusting parameters (luminance, contrast, etc.) according to program genre information associated with an image to be displayed on the image display unit 111. If a plurality of images are simultaneously displayed on the same screen, the image quality adjusting parameter determining unit 116 determines the image quality adjusting parameters (luminance, contrast, etc.) based on a combination of program genre information associated with the respective images. The following is an exemplary embodiment that causes the image display unit 111 to display two images.

A program information analyzing unit 115 included in the system control unit 114 extracts TV program information (e.g., TV program name, program media identification information, broadcasting time information, and program genre information) from the TV program information received from the data separating unit 104. The program information analyzing unit 115 outputs the extracted program genre information to the image quality adjusting parameter determining unit 116. When the image display unit 111 displays two images, the image quality adjusting parameter determining unit 116 receives two pieces of program genre information respectively associated with the two images to be displayed.

The image quality adjusting parameter determining unit 116 determines a program genre based on the program genre information extracted by the program information analyzing unit 115. The program genre is, for example, "movie", "drama", "sports", or "variety show."

A viewing priority determining unit 117 included in the system control unit 114 determines a viewing priority that indicates a main image viewed by a user among a plurality of images displayed on the image display unit 111. For example, the viewing priority determining unit 117 can designate an image of a TV program whose sound is output from the speaker output unit 112 as a main image and the other as a sub image. The user can select a main image and a sub image via the remote controller 152. The viewing priority determining unit 117 outputs a determined viewing priority to the image quality adjusting parameter determining unit 116.

Figure 3:
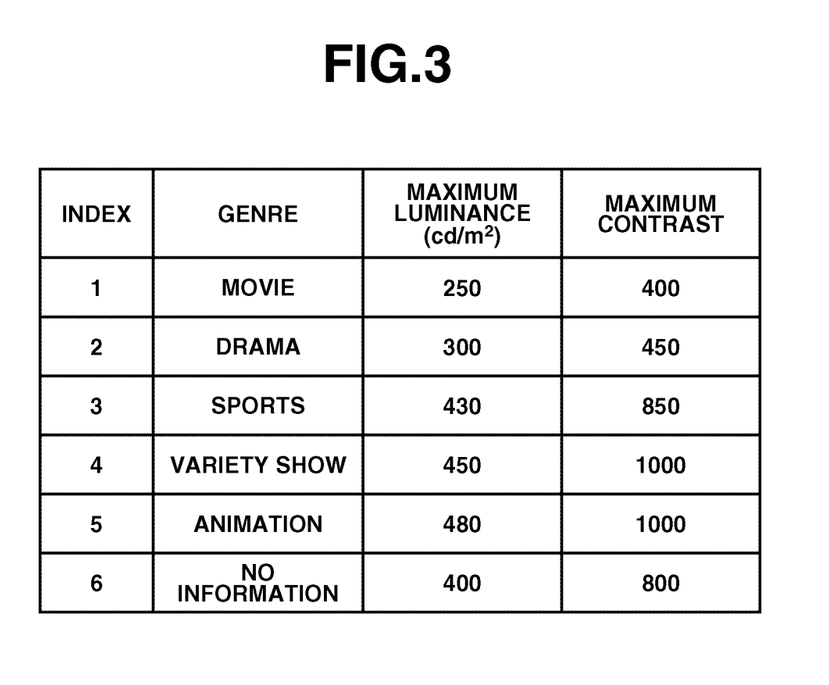
FIG. 3 illustrates an exemplary parameter table usable for displaying a single image according to an exemplary embodiment of the present invention.
Figure 4:
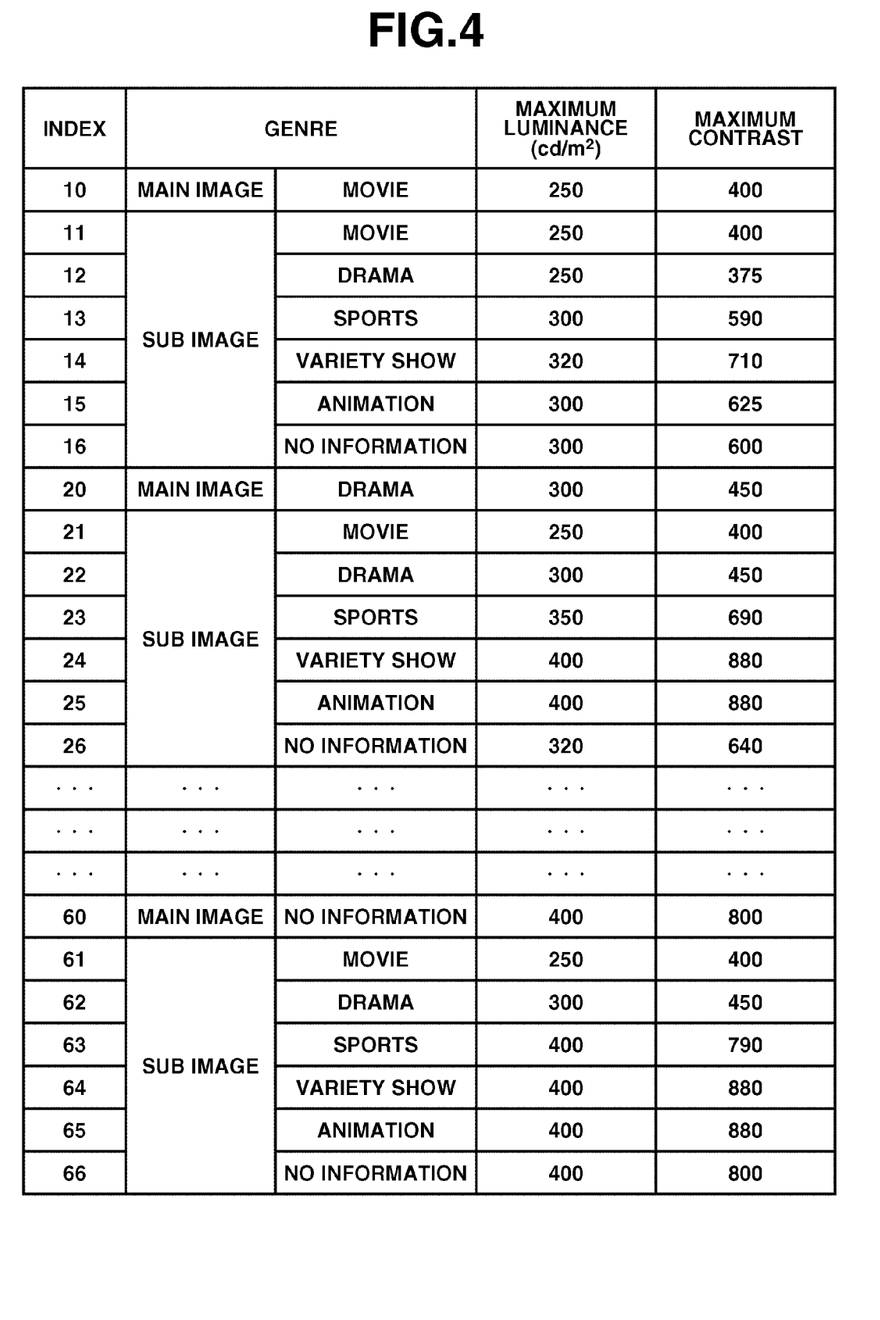
FIG. 4 illustrates another exemplary parameter table usable for simultaneously displaying two images according to an exemplary embodiment of the present invention.

The image quality adjusting parameter determining unit 116 stores parameter tables illustrated in FIGS. 3 and 4 indicating image quality adjusting parameters (maximum luminance, maximum contrast, etc.) allocated for each program genre. FIG. 3 illustrates a parameter table usable when the image display unit 111 displays a single image. FIG. 4 illustrates a parameter table usable when the image display unit 111 displays two images.

For example, if a single image displayed on the image display unit 111 is categorized into the "movie" genre, the image processing unit 107 refers to "index 1" of the table illustrated in FIG. 3 and sets the maximum luminance to 250 ($cd/m^2$) and the maximum contrast to 400:1 for an image to be displayed.

If the image display unit 111 displays two images, parameter table setting is performed in the following manner. An exemplary setting for a combination of different program genres is performed to reduce differences between a main image and a sub image in the image quality adjusting parameters compared to a case where only one of the main image or the sub image is fully displayed on a screen. However, in view of an attainment of optimum viewing environment, enhancing the image quality adjusting parameters in a two-screen display mode compared to the parameters in a one-screen display mode is not preferable.

Accordingly, in a case where a main image and a sub image are displayed in a two-screen display mode, attenuating the image quality adjusting parameters of respective images compared to those of an image of a single program genre in a one-screen display mode is useful to reduce differences between the main image and the sub image in the image quality adjusting parameters. An exemplary operation for displaying a main image of the "movie" genre and a sub image of the "sports" genre is described below with reference to FIG. 4.

The image quality adjusting parameter determining unit 116 refers to "index 10" of the parameter table illustrated in FIG. 4 and sets the maximum luminance to 250 ($cd/m^2$) and the maximum contrast to 400:1 for the main image. Next, the image quality adjusting parameter determining unit 116 refers to "index 13" and sets the maximum luminance to 300 ($cd/m^2$) and the maximum contrast to 590:1 for the sub image.

The image processing unit 107 adjusts the image quality (luminance, contrast, etc.) of image data based on the image quality adjusting parameters determined by the image quality adjusting parameter determining unit 116.

Figure 5:
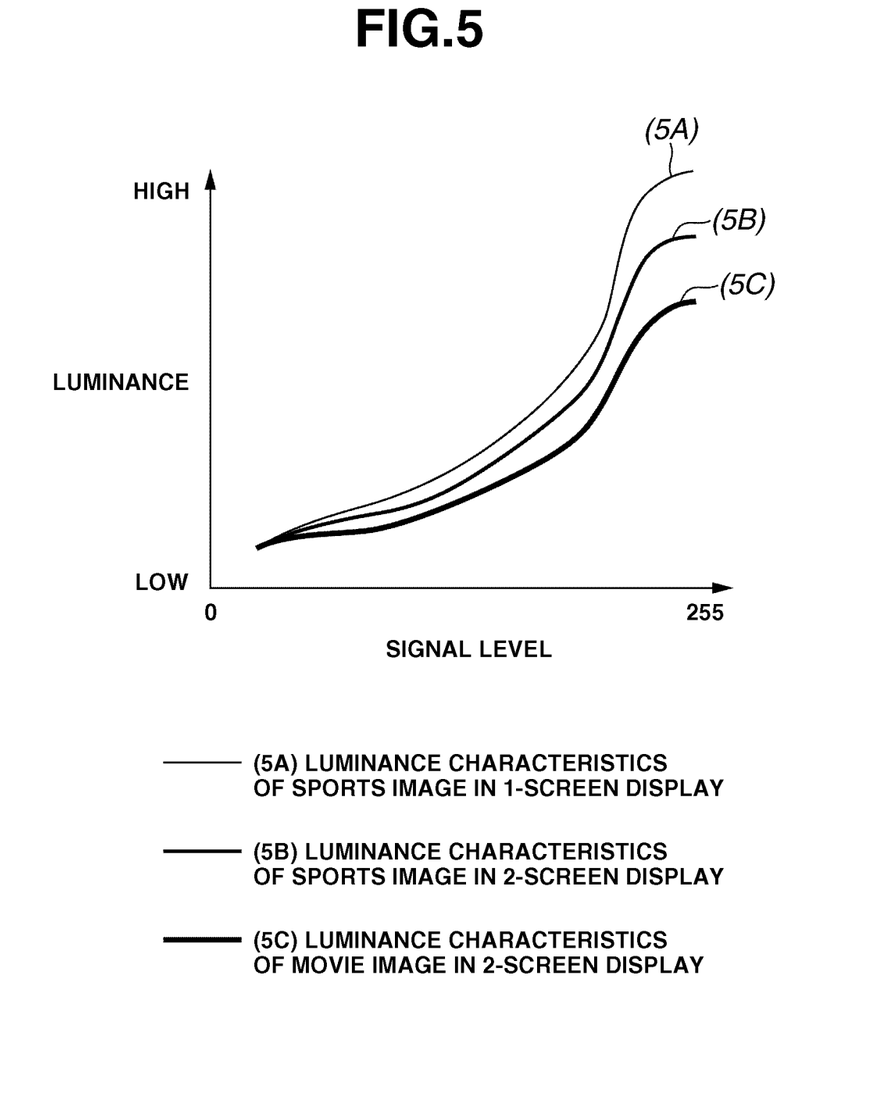
FIG. 5 is a graph illustrating luminance characteristics according to an exemplary embodiment of the present invention.

FIG. 5 illustrates luminance characteristics in a case where the program genre of a main image is "movie" and the program genre of a sub image is "sports." Line 5A indicates luminance characteristics applicable when the image display unit 111 displays a single image of the "sports" genre. Line 5B indicates luminance characteristics of a sub image and line 5C indicates luminance characteristics of a main image, which are applicable when the main image belongs to the "movie" genre and the sub image belongs to the "sports" genre.

The line 5C also indicates luminance characteristics applicable when the image display unit 111 displays a single image of the "movie" genre. As apparent from the comparison between two luminance characteristics 5A and 5B, a sub image in the two-screen display mode is darker than an image in the one-screen display mode. As a result, compared to an adjustment in the two-screen display mode performed using the characteristics 5A, an exemplary embodiment can reduce a difference in luminance between the main image and the sub image. Similar to the adjustment of luminance, an exemplary embodiment can reduce a difference in contrast ratio between the main image and the sub image. Controlling the respective image qualities of two images as described above can reduce a flicker effect caused by differences in brightness between the main image and the sub image.

A second exemplary embodiment of the present invention can change image quality adjusting parameters (luminance, contrast, etc.) for a sub image based on a ratio of a display area of a main image to a display area of the sub image on a screen. More specifically, when the maximum luminance and contrast values of a sub image exceed those of a main image, the image control apparatus 100 obtains a ratio of a display area of the sub image to a display area of the main image and multiplies the maximum luminance and contrast values of the sub image by the obtained ratio. The image control apparatus 100 can calculate a ratio of two display areas based on size information of each image data obtained from the image adjusting unit 118.

Figure 6:
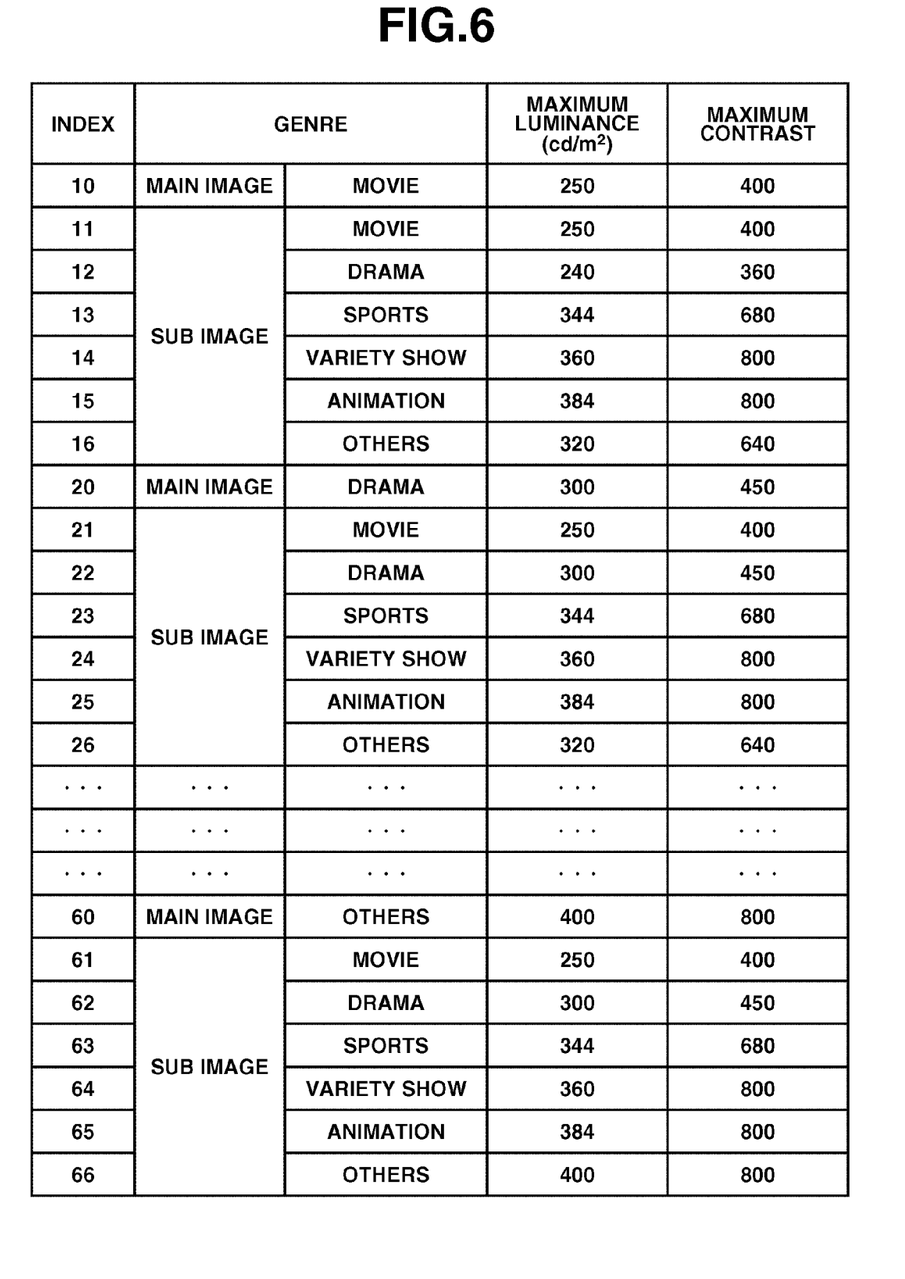
FIG. 6 illustrates another exemplary parameter table usable for simultaneously displaying two images according to an exemplary embodiment of the present invention.

FIG. 6 illustrates an exemplary parameter table for a two-screen display mode, usable when a sub image is smaller than a main image in display area and a ratio of displays is equal to 0.8. For example, when the program genre of the main image is "drama" and the program genre of the sub image is "sports", the image control apparatus 100 selects "index 23". The image control apparatus 100 sets the maximum luminance of the sub image to 344 ($cd/m^2$), which is obtained by multiplying 0.8 with the maximum luminance 430 ($cd/m^2$) in a one-screen display mode illustrated in FIG. 3.

Thus, an exemplary embodiment can reduce differences in luminance and contrast between the main image and the sub image. Thus, a flicker effect can be reduced.

A third exemplary embodiment of the present invention can use program media identification information in addition to program genre information in determining image quality adjusting parameters.

The image quality adjusting parameter determining unit 116 in the system control unit 114 illustrated in FIG. 1 determines the type of program genre information based on the program genre information and the program media identification information extracted by the program information analyzing unit 115.

When the program media identification information indicates "television broadcasting," the image control apparatus 110 performs determination processing similar to that described in the first exemplary embodiment.

When the program media identification information indicates "data broadcasting," the image control apparatus 100 generates new program genre information titled "data broadcasting" as a determination result, regardless of the program genre information extracted by the program information analyzing unit 115.

When the program media identification information indicates "radio broadcasting," the image control apparatus 100 generates program genre information titled "no information" as a determination result.

Figure 7:
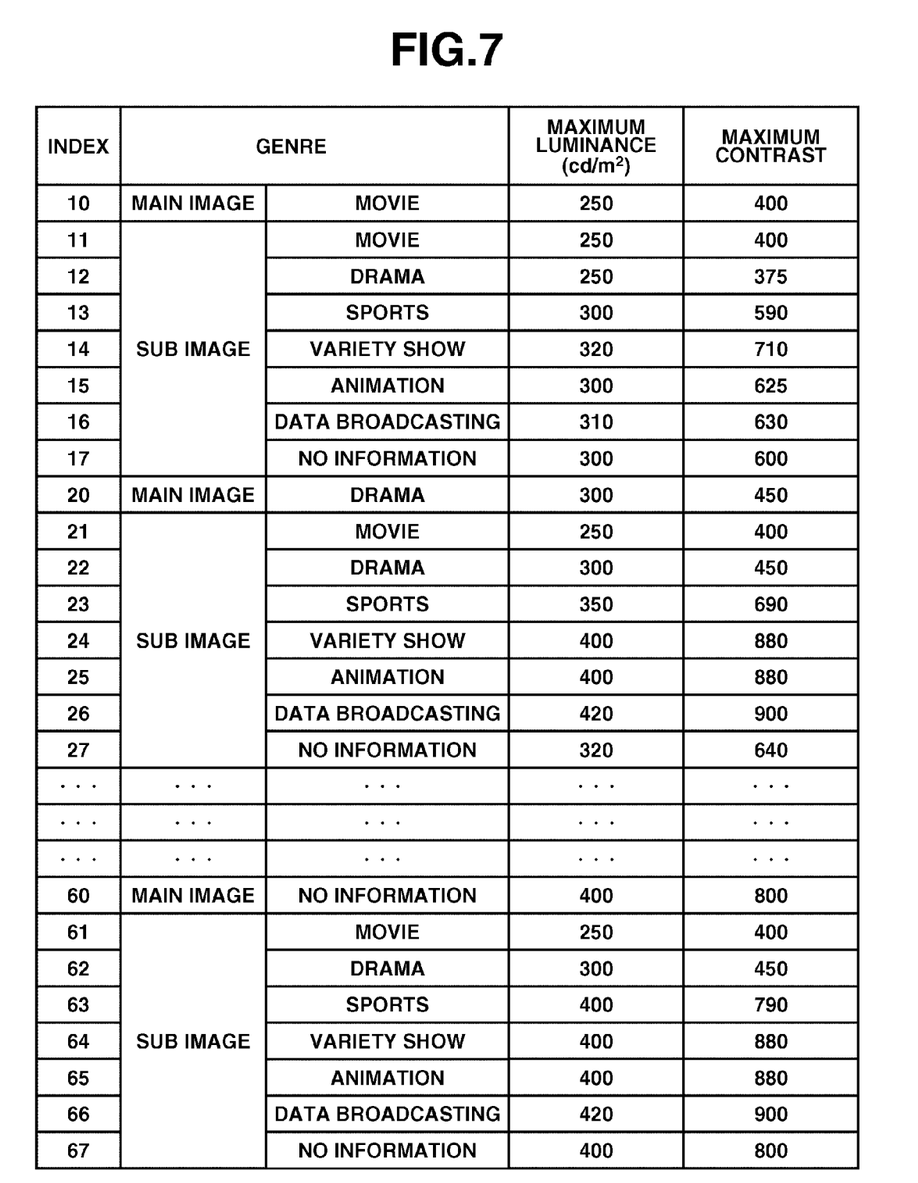
FIG. 7 illustrates another exemplary parameter table usable for simultaneously displaying two images according to an exemplary embodiment of the present invention.

The image quality adjusting parameter determining unit 116 stores the image quality adjusting parameters determined based on a combination of program genre information into a parameter table illustrated in FIG. 7.

Figure 8:
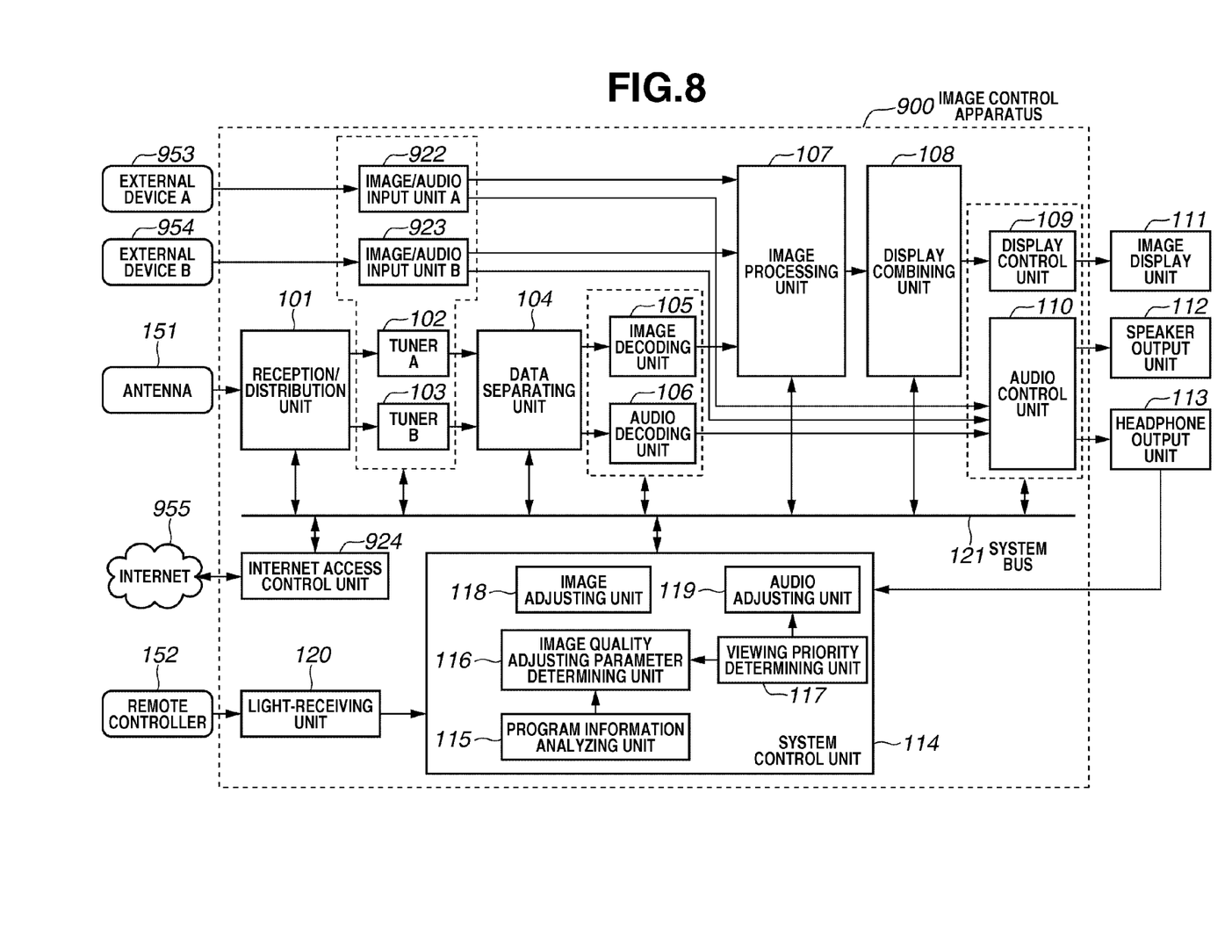
FIG. 8 is a block diagram illustrating an example of a configuration of an image control apparatus according to an exemplary embodiment of the present invention.

FIG. 8 is a block diagram illustrating an example of a configuration of an image control apparatus 900 according to a fourth exemplary embodiment of the present invention. Respective units denoted by reference numerals identical to those illustrated in FIG. 1 can perform the similar functions.

The image control apparatus 900 can receive television broadcasting signals via the antenna 151 as well as image and audio data from an external device (a game machine, a video device, or the like) or a video-on-demand (VOD) server via the Internet. Thus, the image source for the image control apparatus 900 includes a television broadcasting program, an external device, and an Internet server.

An image/audio input unit A 922 serves as a data input control unit configured to input image/audio data from an external device A 953. An image/audio input unit B 923 serves as a data input control unit configured to input image/audio data from an external device B 954. The image/audio input units A 922 and B 923 transmit the input image data to the image display unit 111 via the image processing unit 107, the display combining unit 108, and the display control unit 109. The image display unit 111 displays an image represented by the image data. In an exemplary embodiment, the image/audio input unit B 923 serves as a data input control unit connectable to a game machine. An Internet access control unit 924 receives image data, audio data, and video information data from a video-on-demand (VOD) server (not illustrated) accessible via the Internet 955.

In response to user's operational information input via the remote controller 152, the image control apparatus 900 selects a channel of a desired television broadcasting program, selects the external device A 953 or the external device A 954 that receives image/audio data from an external device, or receives video content provided by the VOD service via the Internet 955.

The program information analyzing unit 115 extracts TV program information from TV program data, or extracts a video title, a Uniform Resource Locator (URL) of a video data distribution source, usable time information of a video, and video genre information from the video information data received via the Internet access control unit 924. The program information analyzing unit 115 outputs the extracted video genre information to the image quality adjusting parameter determining unit 116.

The program genre information and the video genre information can be collectively referred to as image genre information.

The image quality adjusting parameter determining unit 116 determines a genre of each displayed image based on the program genre information of a television broadcasting program, video genre information of video content supplied from a VOD service, or a selected state of the image/audio input unit A 922 or the image/audio input unit B 923.

Similar to the first to third exemplary embodiments, the image control apparatus 900 determines a type of genre information based on genre information associated with the television broadcasting program or the video content of a VOD service.

When the image display unit 111 displays an image received via the image/audio input unit A 922, the image control apparatus 900 generates genre information titled "no information" as a determination result.

When the image display unit 111 displays an image received via the image/audio input unit B 923, the image control apparatus 900 generates genre information titled "game" as a determination result.

Figure 9:
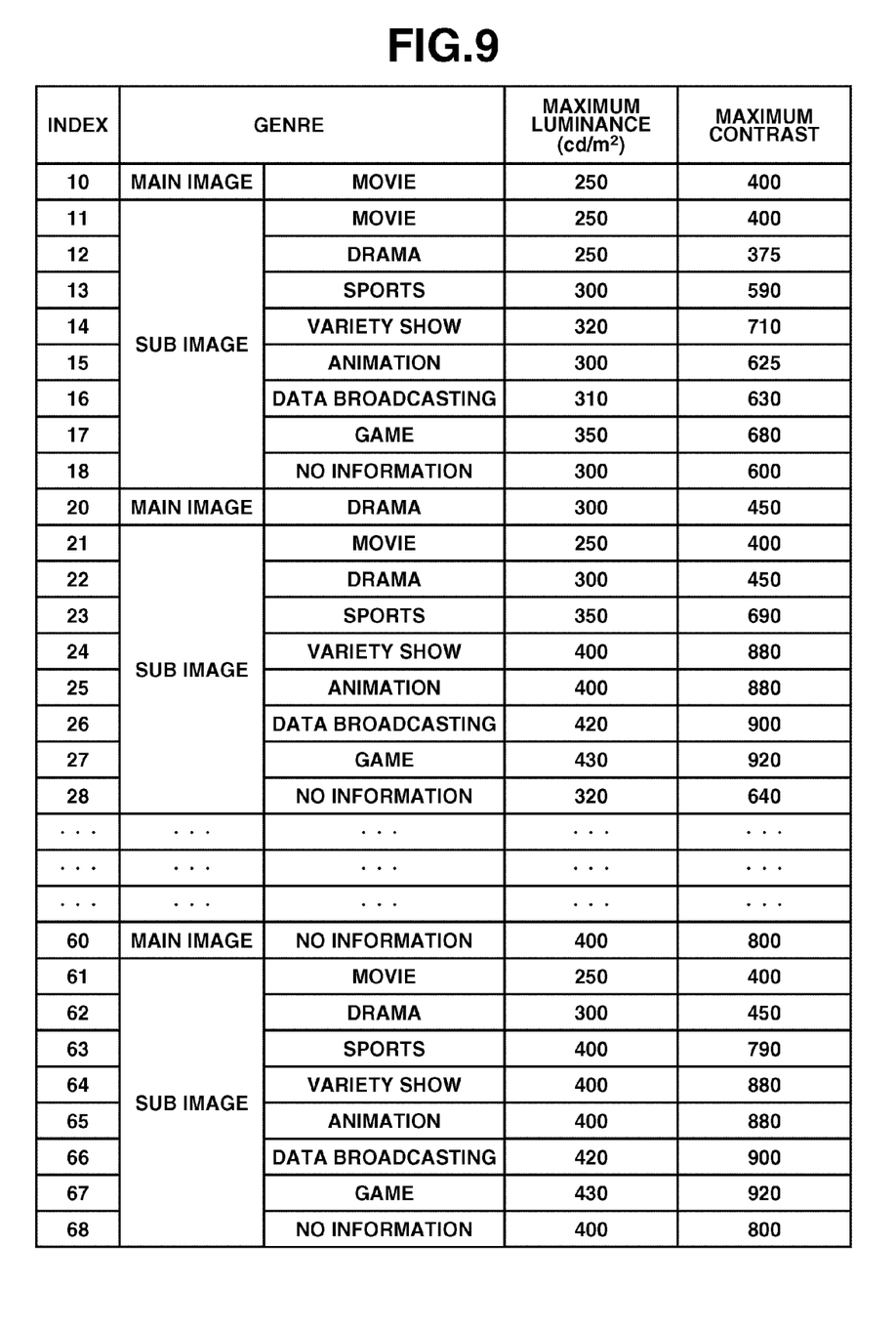
FIG. 9 illustrates another exemplary parameter table usable for simultaneously displaying two images according to an exemplary embodiment of the present invention.

The image quality adjusting parameter determining unit 116 stores the image quality adjusting parameters determined based on a combination of program genre information into a parameter table illustrated in FIG. 9. The parameter table illustrated in FIG. 9 is different from the parameter table illustrated in FIG. 7 in that index 17, index 27, . . . , index 67 associated with the "game" genre are added. Similar to the above-described exemplary embodiments, the image quality adjusting parameter determining unit 116 determines image quality adjusting parameters for each image based on a combination of genre information stored in the table illustrated in FIG. 9.

An exemplary embodiment of the present invention can perform the above-described image quality adjustment for color saturation and color temperature in addition to luminance and contrast.

An exemplary embodiment of the present invention can receive television broadcasting data via a cable television network which is one of the image sources, instead of using the antenna 151.

According to another exemplary embodiment, the image display unit 111 can display three or more images received from various image/audio sources (television broadcasting, external devices, VOD, etc.).

Although the above-described exemplary embodiments determine the image quality adjusting parameters for each image based on a combination of program genre information, an exemplary embodiment of the present invention can use information other than the genre information. For example, the parameter tables illustrated in FIGS. 4, 6, 7, and 9 can be modified appropriately to determine the image quality adjusting parameters according to a combination of a program name and a broadcasting channel involved in TV program information, a video title involved in video information data, and a Uniform Resource Locator (URL) of a video data distribution source.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-328207 filed Dec. 05, 2006, which is hereby incorporated by reference herein in its entirety.

What is claimed is:

1. An image control apparatus configured to input a plurality of image data associated with a plurality of broadcast programs and to display a plurality of images based on the plurality of image data in a multi-screen display mode, the image control apparatus comprising:
a processor; and
a memory coupled to the processor to store instructions that, when executed by the processor, cause the processor to perform operations comprising:
reading out a table indicating image quality adjusting parameters corresponding to a plurality of predetermined program genres;
determining respective image qualities of the plurality of images based on a combination of program genre of the plurality of images displayed in the multi-display mode, so as to reduce a difference of image qualities between the plurality of images according to the combination of program genre of the plurality of images; and
processing the plurality of image data to cause the plurality of images to have the determined respective image qualities,
wherein an image quality adjusting parameter corresponding to a program genre of a sub image displayed in the multi-screen display mode differs dependent on a program genre of a main image combined with the sub image.

2. The image control apparatus according to claim 1, wherein the image quality adjusting parameter is maximum luminance or maximum contrast, an image quality adjusting parameter corresponding to a program genre of a main image displayed in the multi-screen display mode is same as an image quality adjusting parameter corresponding to the program genre of an image displayed in a single-screen display mode, and an image quality adjusting parameter corresponding to a program genre of a sub image displayed in the multi-screen display mode is smaller than an image quality adjusting parameter corresponding to the program genre of an image displayed in a single-screen display mode.

3. The image control apparatus according to claim 1, wherein determining respective image qualities of the plurality of images comprises determining respective image qualities of the plurality of images based on a display size of the main image and a display size of the sub image in the multi-screen display mode.

4. The image control apparatus according to claim 1, further comprising an audio control unit configured to input a plurality of audio data multiplexed with the plurality of image data and to selectively output one of the plurality of audio data, and wherein the audio control unit outputs audio data corresponding to the main image displayed in the multi-screen display mode.

5. The image control apparatus according to claim 1, wherein the plurality of predetermined program genres include at least one of movie, drama, sports, and variety show.

6. A method for inputting a plurality of image data associated with a plurality of broadcast programs and displaying a plurality of images based on the plurality of image data in a multi-screen display mode, the method comprising:

reading out a table indicating image quality adjusting parameters corresponding to a plurality of predetermined program genres, determining respective image qualities of the plurality of images based on a combination of program genre of the plurality of images displayed in the multi-display mode, so as to reduce a difference of image qualities between the plurality of images according to the combination of program genre of the plurality of images; and processing the plurality of image data to cause the plurality of images to have the respective determined image qualities, wherein an image quality adjusting parameter corresponding to a program genre of a sub image displayed in the multi-screen display mode differs dependent on a program genre of a main image combined with the sub image.

7. The method according to claim 6, wherein the image quality adjusting parameter is maximum luminance or maximum contrast, an image quality adjusting parameter corresponding to a program genre of a main image displayed in the multi-screen display mode is same as an image quality adjusting parameter corresponding to the program genre of an image displayed in a single-screen display mode, and an image quality adjusting parameter corresponding to a program genre of a sub image displayed in the multi-screen display mode is smaller than an image quality adjusting parameter corresponding to the program genre of an image displayed in a single-screen display mode.

8. The method according to claim 6, wherein determining the respective image qualities comprises determining the respective image qualities of the plurality of images based on a display size of the main image and a display size of the sub image in the multi-screen display mode.

9. The method according to claim 6, further comprising inputting a plurality of audio data multiplexed with the plurality of image data and to selectively output one of the plurality of audio data, and wherein the audio data is output corresponding to the main image displayed in the multi-screen display mode.

10. The method according to claim 6, wherein the plurality of predetermined program genres include at least one of movie, drama, sports, and variety show.

* * * * *